(12) United States Patent
Xie et al.

(10) Patent No.: US 10,334,414 B2
(45) Date of Patent: Jun. 25, 2019

(54) MANAGING MULTIPLE MOBILE DEVICES ON DIFFERENT OPERATOR NETWORKS

(71) Applicant: Cisco Technology, Inc., San Jose, CA (US)

(72) Inventors: Lihuan Xie, Sunnyvale, CA (US); Stephan Otto, Palo Alto, CA (US); Blair David Martin, Sunnyvale, CA (US); Suvitha Kesavan, San Jose, CA (US); Suparna Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 15/390,487

(22) Filed: Dec. 24, 2016

(65) Prior Publication Data

US 2018/0184229 A1    Jun. 28, 2018

(51) Int. Cl.
| | | |
|---|---|---|
| *H04W 8/00* | (2009.01) | |
| *H04W 4/50* | (2018.01) | |
| *H04W 8/02* | (2009.01) | |
| *H04L 29/06* | (2006.01) | |
| *H04L 29/08* | (2006.01) | |
| *H04W 4/20* | (2018.01) | |

(52) U.S. Cl.
CPC ........... *H04W 4/50* (2018.02); *H04L 67/2838* (2013.01); *H04L 67/36* (2013.01); *H04L 69/08* (2013.01); *H04W 4/203* (2013.01); *H04W 8/005* (2013.01); *H04W 8/02* (2013.01)

(58) Field of Classification Search
CPC ....... H04W 12/08; H04W 4/24; H04W 16/10; H04W 16/14
USPC ................... 455/414.1, 415, 419, 452.2, 418
See application file for complete search history.

(56) References Cited

U.S. PATENT DOCUMENTS

2013/0066986 A1\* 3/2013 DiCosola ............... G06Q 10/10
709/206

\* cited by examiner

*Primary Examiner* — Sam Bhattacharya
(74) *Attorney, Agent, or Firm* — Behmke Innovation Group LLC; James Behmke; Stephen D. LeBarron (57) ABSTRACT

Disclosed are techniques for managing mobile devices, such as cellphones, tablets, and laptops, deployed on different operator networks, such as cellular networks, permissioned Wi-Fi networks, LANs, and WANs. The techniques include receiving, at an interface module, a request identifying at least two mobile devices and at least two of a plurality of operator networks associated therewith. The request manages each device by changing a configuration of the device on each associated network. The techniques include selecting at least two of a plurality of adapter modules, each configured to communicate with one of the plurality of networks, based on the request. The techniques further include bridging, using the selected adapter modules, communication between the interface module and the associated networks, such as transmitting the request to and receiving a response from each network. The techniques also include aggregating the received responses and transmitting the aggregated responses to the interface module.

20 Claims, 6 Drawing Sheets

MANAGING MULTIPLE MOBILE DEVICES ON DIFFERENT OPERATOR NETWORKS

TECHNICAL FIELD

The present disclosure generally relates to mobile communication systems, and, in particular, to managing mobile devices that are deployed on different operator networks.

BACKGROUND

An enterprise typically utilizes numerous computing devices. For example, in some enterprises, employees have and/or are assigned computing devices that the employees use to perform their duties within the enterprise. The computing devices typically include mobile communication devices, or simply "mobile devices," that are deployed on operator networks. The mobile devices may include various types of devices, such as cellular phones, smartphones, tablet computers, laptop computers, and other portable devices. Due to the variety of operator networks that are available, mobile devices affiliated with an enterprise are usually deployed on a range of different operator networks—including cellular networks, permissioned Wi-Fi networks, and/or various LANs and WANs. As a result, in order to manage each of the mobile devices, an enterprise system may interface with a corresponding operator network via a dedicated user interface, or a so-called "dashboard," which may be unique to the mobile device and the particular operator network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described herein to provide a thorough understanding of the illustrative implementations shown in the accompanying drawings. However, the drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been shown or described in exhaustive detail for the sake of brevity and so as not to obscure more pertinent aspects of the described example implementations.

Overview

In various implementations disclosed herein, a device management system includes a non-transitory memory and one or more processors that enable the system to perform a method of managing multiple mobile devices associated with different operator networks. The method includes receiving, at an interface module, a request including an indicator identifying first and second mobile devices and first and second ones of a plurality of operator networks associated with the first and second mobile devices. The request initiates a change in a configuration state of the first and second mobile devices on the first and second ones of the plurality of operator networks. The method further includes selecting, using a delegator module, first and second ones of a plurality of adapter modules based on the request. Each of the plurality of adapter modules is configured to communicate with a particular one of the plurality of operator networks. The method still further includes bridging, using each of the selected first and second ones of the plurality of adapter modules, communication between the interface module and a particular one of the first and second ones of the plurality of operator networks. The method also includes aggregating, using an aggregator module, first and second responses received from the first and second ones of the plurality of operator networks in response to bridging the communication between the interface module and the first and second ones of the plurality of operator networks.

Example Embodiments

The present disclosure generally relates to the field of mobile communications, and, more particularly, to managing mobile communications devices (hereinafter, "mobile devices") that are associated with communications networks provided by various operators (hereinafter, "operator networks"). According to various implementations, a device management system is configured to manage mobile devices that are associated with a single enterprise, such as a corporation, but are deployed on multiple different operator networks. In some implementations, the device management system includes a non-transitory memory and one or more processors that enable the system to perform a method. In some implementations, the method includes receiving, at an interface module of the device management system, a device management request (hereinafter, "request) that includes an indicator. In some implementations, the device management system receives the request from an enterprise user of the system via a graphical user interface (GUI), such as a so-called "dashboard," implemented as part of the interface module. In some implementations, the indicator includes information that explicitly or implicitly identifies multiple ones of the mobile devices associated with the enterprise and multiple ones of the different operator networks on which the devices are deployed. In some implementations, the request initiates a change in a configuration state of each mobile device identified by the request on the corresponding operator network. For example, in some implementations, the request initiates a change to one or more parameters of the mobile device that pertain to the operator network. In other words, in some implementations, the request is configured to manage the mobile device on the operator network.

In some implementations, the method performed by the device management system further includes selecting multiple ones of different adapter modules that are included in the system based on the request. In some implementations, each of the different adapter modules is configured to communicate with a particular one of the different operator networks associated with the mobile devices of the enterprise. In some implementations, each of the selected adapter modules is configured to communicate with a particular one of the operator networks on which a particular one of the mobile devices indicated by the request is deployed. In some implementations, the device management system selects the adapter modules based on any of a variety of textual, numeric, symbolic, and other types of matches identified by the system between the operator networks identified by the request and the operator networks associated with the selected adapter modules.

In some implementations, the method performed by the device management system still further includes bridging communication between the interface module and the operator networks associated with the mobile devices indicated by the request using the selected adapter modules. In other words, in some implementations, upon selecting the adapter modules, the device management system uses each module as an interface between the interface module and the corresponding operator network on which a particular one of the mobile devices indicated by the request is deployed. In some implementations, bridging the communication in this manner includes transmitting the request, such as a request to change a configuration state of the mobile device on the operator network, from the interface module to the network using the selected adapter module. In some implementations, bridging the communication further includes receiving a device management response (hereinafter, "response"), such as a confirmation of the changed configuration state of the mobile device, from the operator network in response to transmitting the request, and transmitting the response to the interface module.

In some implementations, the method performed by the device management system also includes aggregating multiple responses received from the operator networks associated with the mobile devices indicated by the request in response to bridging the communication between the interface module and the operator networks. In some implementations, aggregating the responses in this manner includes selecting one or more results from each response. For example, in some implementations, aggregating the responses includes selecting one or more results that have been received as part of one or more of the responses within a predetermined time period following transmitting the request from the interface module to the operator networks. In additional implementations, the method performed by the device management system includes receiving, at the interface module from the enterprise user, a result request and selecting one or more additional results from each response. In still other implementations, the method performed by the device management system includes receiving, at the interface module from the enterprise user, a search query and performing a search for one or more of the mobile devices associated with the enterprise on one or more of the different operator networks.

In this manner, the techniques of the present disclosure may, in some examples, enable enterprises to efficiently manage multiple mobile devices that are deployed on different operator networks. Additionally, the techniques may, in some instances, improve user experience. For example, the techniques may enable an enterprise user to manage multiple mobile devices by communicating with multiple operator networks associated with the devices using a unified interface (e.g., a GUI), or dashboard. In particular, the techniques may enable the user to submit a request associated with the mobile devices to the operator networks, view results that are responsive to the request, request to view additional results, and perform searches of the networks for specific mobile devices, using the unified interface, or dashboard. As a result, the user may manage the mobile devices using less time compared to other techniques, such as when using a dedicated interface or dashboard associated with each device, thereby improving the user's efficiency. Furthermore, by enabling the user to manage the mobile devices using the unified interface rather than the dedicated interface associated with each device, the techniques may also improve the user's experience.

A mobile device, as used herein, may include any portable computing device capable of communicating with an operator network and, in particular, with an operator or entity associated with the network, over a corresponding network infrastructure (e.g., a network of cellular towers and associated devices). The mobile device may include any of a smartphone, a tablet, and a laptop computing device, as well as any other portable computing device having another form factor, such as a smart watch, smart glasses, or another device type. Additionally, the mobile device of the present disclosure may use a variety of different operating systems or platforms, such as ANDROID® by Google Inc., IOS® by Apple Inc., or WINDOWS PHONE® by Microsoft Corporation, as some examples.

An operator network, as used herein, may include any type of network, such as a mobile network. In some implementations, the operator network includes a cellular network provided by any of a variety of network operators or entities, such as AT&T, Verizon, Sprint, Voda, and Orange, as some examples. In some implementations, the operator network includes a Long-Term Evolution (LTE) network, including LTE network elements such as any of eNodeB, Home Subscriber Server (HSS), Packet Data Network Gateway (P-GW), serving gateway (S-GW), and Mobility Management Entity (MME), as some examples. In some implementations, the operator network includes any of a permissioned Wi-Fi network and any of a variety of local area networks (LANs) and wide area networks (WANs), each of which is provided by any number of network operators or entities. Accordingly, the operator network of the present disclosure may be implemented using a variety of network technologies. Furthermore, the operator network may be associated with a particular network operator or entity. As described herein, the operator network may have deployed thereon one or more mobile devices that are each configured to communicate with the associated network operator or entity over a corresponding network medium. As also described herein, the operator network may provide an interface or dashboard configured to enable users to manage the mobile devices deployed on the network, such as change a configuration state of each such device on the network.

Figure 1:
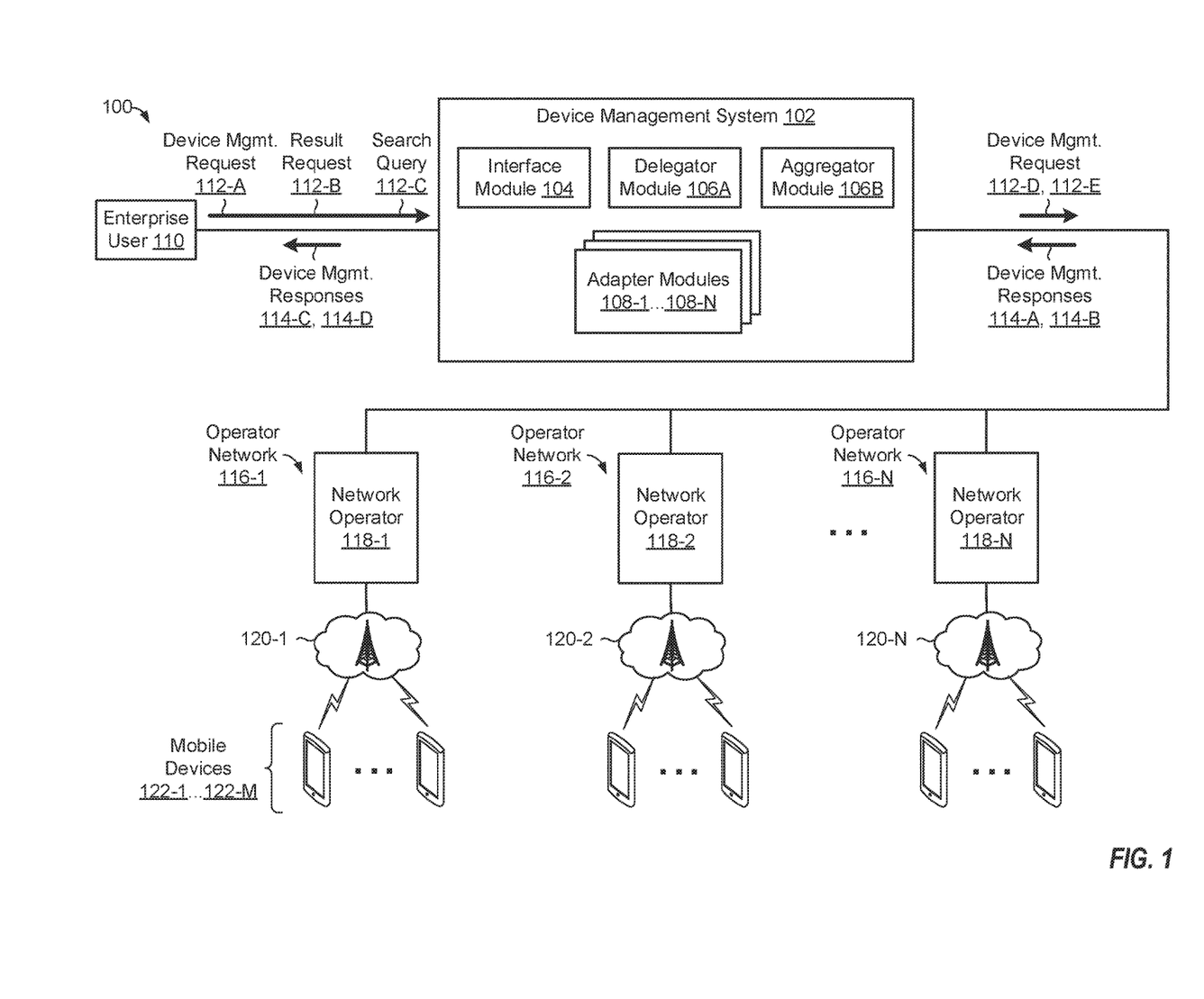
FIG. 1 is a schematic diagram of a device management environment that includes a device management system in communication with multiple operator networks in accordance with some implementations.

FIG. 1 depicts a device management environment 100 including a device management system 102 that is in communication with an enterprise user 110 and multiple operator networks 116-1 . . . 116-N. While certain specific features are illustrated, those of ordinary skill in the art will appreciate from the present disclosure that various other features have not been illustrated for the sake of brevity and so as not to obscure more pertinent aspects of the example implementations disclosed herein. In the example environment 100, the enterprise user 110 is an administrator user associated with an enterprise. The device management system 102, in turn, is a system of one or more computing devices used by the enterprise user 110 to manage multiple mobile devices 122-1 . . . 122-M that are also associated with the enterprise. In this example, each of the mobile devices 122-1 . . . 122-M is deployed on a particular one of the operator networks 116-1 . . . 116-N.

In the example of FIG. 1, each of the operator networks 116-1 . . . 116-N includes a network operator (e.g., one of network operators 118-1 . . . 118-N) and a network infrastructure, such as a network of cellular towers and associated devices (e.g., one of network infrastructures 120-1 . . . 120-N). In some implementations, the network operator serves as a gateway for the network infrastructure. In some implementations, the network operator channels traffic between the network infrastructure and a computing device that is located outside of the corresponding operator network. To that end, in some implementations, the network operator includes a gateway node. In some implementations, each network infrastructure includes various network elements, such as a set of interconnected physical network nodes (e.g., servers, routers, modems, etc.) that enable communication between the corresponding ones of the mobile devices 122-1 . . . 122-M. In some implementations, the network elements are configured to control the flow of data packets between the mobile devices. In some implementations, the network elements include various components of cellular networks.

In the example of FIG. 1, each network operator provides one or more network interfaces that enable users to manage the corresponding ones of the mobile devices 122-1 . . . 122-M that are deployed or are operating on the associated operator network. In some implementations, the network interfaces enable the users to view a list of mobile devices that are deployed on the operator network, change a subscription plan, such as a rate plan, for one or more of the devices, add and/or remove features (e.g., roaming, hotspot, etc.) for one or more of the devices, add a new mobile device to the network, and so forth. In this manner, the network interfaces enable the users to change configuration states of the mobile devices 122-1 . . . 122-M with respect to, or on, the operator networks 116-1 . . . 116-N. In some implementations, the users communicate with the network interfaces provided by each network operator using a dedicated interface or dashboard. As a result, in some implementations, users wishing to communicate with multiple ones of the network operators interact with multiple different interfaces or dashboards. Advantageously, the device management system 102 of the present disclosure enables the users to interact with multiple ones of the network operators using a single unified interface or dashboard.

As shown in FIG. 1, the enterprise user 110 manages the mobile devices 122-1 . . . 122-M by communicating directly with the device management system 102. In some implementations, the enterprise user 110 communicates with the device management system 102 using a client device (not shown). In the example of FIG. 1, the enterprise user 110 provides a request 112-A to an interface module 104 of the device management system 102. In this example, the request 112-A includes an indicator (e.g., packetized binary data) that identifies first and second ones of the mobile devices 122-1 . . . 122-M and first and second ones of the operator networks 116-1 . . . 116-N that are associated with the first and second devices. Also in this example, the request 112-A initiates a change in a configuration state of the first and second mobile devices on the first and second operator networks. In some implementations, each of the first and second operator networks is associated with a particular one of the first and second mobile devices. In these implementations, the request 112-A initiates a change in a configuration state of each of the first and second mobile devices on the corresponding one of the first and second operator networks. In other words, the request 112-A is configured to cause each of the first and second operator networks to, upon receiving the request 112-A, change a configuration state of a particular one of the first and second mobile devices with respect to the network. In some implementations, the enterprise user 110 provides the request 112-A by inputting one or more parameters associated with the first and second mobile devices and, e.g., the first and second operator networks, into a GUI provided by the interface module 104.

As further shown in FIG. 1, a delegator module 106A of the device management system 102 selects first and second ones of multiple adapter modules 108-1 . . . 108-N included in the system 102 based on the request 112-A. In the example of FIG. 1, each of the adapter modules 108-1 . . . 108-N is configured to communicate with a particular one of the operator networks 116-1 . . . 116-N. In some implementations, each of the first and second adapter modules selected by the delegator module 106B is configured to communicate with a particular one of the first and second operator networks identified by the request 112-A. In some implementations, to select each of one or more of the first and second adapter modules, the delegator module 106A determines a correspondence, such as a textual, numeric, symbolic, and/or another match, between the request 112-A and the selected adapter module. For example, in some implementations, the delegator module 106A determines an identity relationship between one of the first and second operator networks identified by the request 112-A and an operator network associated with the selected adapter module. In some implementations, to determine the identity relationship, the delegator module 106A makes a call (e.g., an API call, a subroutine call, etc.) to the selected adapter module.

As still further shown in FIG. 1, each of the first and second selected adapter modules bridges communication between the interface module 104 and the corresponding one of the first and second operator networks identified by the request 112-A. As described herein, in some implementations, to bridge the communication between the interface module 104 and each of one or more of the first and second operator networks, the selected adapter module transmits the request 112-A (e.g., as a translated version of the request 112-B) to the network. In some implementations, the selected adapter module further receives a response (e.g., one of responses 114-A, 114-B) from the operator network in response to transmitting the request 112-A (and, e.g., generates a translated version of the response, such as one of translated responses 114-C, 114-D).

In various implementations, the selected adapter module communicates with the operator network via any type of network, such as a LAN, a WAN, and/or the Internet (e.g., a public network, such as portions of the Internet, and/or a private network). In some implementations, the response indicates a status of the request 112-A (e.g., request received, request being processed, request granted, or request denied). In some implementations, the response indicates whether an action requested by the request 112-A has been completed (e.g., a new device was added, a requested rate plan was activated on a mobile device, or an operator network access has been disabled for a mobile device). In some implementations, the response includes information requested by the request 112-A (e.g., a list of mobile devices that are associated with the enterprise and are currently operating on a particular operator network or have a particular feature, such as a roaming package).

As also shown in FIG. 1, and as described in greater detail herein, an aggregator module 106B of the device management system 102 aggregates first and second responses 114-A, 114-B (e.g., translated versions of the responses 114-C, 114-D) received from the first and second operator networks in response to bridging the communication between the interface module 104 and the networks.

In some implementations, the device management system 102 further determines, using the delegator module 106A, an active subscription account, such as a paid access account, corresponding to at least one of the first and second operator networks. In these implementations, the device management system 102 further selects, using the delegator module 106A, at least one of the first and second adapter modules in the manner described above based on this determination. Accordingly, in some implementations, the device management system 102 enables the enterprise user 110 to manage one or more of the mobile devices 122-1 . . . 122-M that are deployed on those of the operator networks 116-1 . . . 116-N for which the user 110 and/or an enterprise with which the user 110 is associated has an active subscription account, such as a paid access account.

In some implementations, the device management system 102 further displays, using the interface module 104 (e.g., a GUI module), a GUI to the enterprise user 110. In some implementations, the device management system 102 receives the request 112-A at the interface module 104 from the enterprise user 110 via the GUI. For example, in some implementations, the enterprise user 110 specifies the request 112-A by inputting one or more textual, numeric, and/or symbolic parameters associated with the first and second mobile devices and, e.g., the first and second operator networks, identified by the request 112-A into the GUI. In some implementations, the interface module 104 (e.g., the GUI module) also displays a visual representation of the aggregated first and second responses 114-A, 114-B (e.g., translated versions of the responses 114-C, 114-D) received from the first and second operator networks to the enterprise user 110 via the same GUI.

In some implementations, to bridge the communication between the interface module 104 and the first and second operator networks, the device management system 102 transmits, using each of one or more of the selected first and second adapter modules, at least a portion of the request 112-A to a particular one of the first and second operator networks (e.g., after translating the request 112-A). In some implementations, to transmit at least the portion of the request 112-A to the operator network, the device management system 102 transmits one of the following: (1) a single query; (2) first and second queries that are different; and (3) a pipeline of queries, including a plurality of different queries. In some implementations, to bridge the communication between the interface module 104 and the first and second operator networks, the device management system 102 further receives, using the selected adapter module, a particular one of the first and second responses 114-A, 114-B from the operator network in response to transmitting at least the portion of the request 112-A to the network. In some implementations, the device management system 102 subsequently transmits, using the selected adapter module, at least a portion of the response to the aggregator module 106B (e.g., after translating the response). In some implementations, to receive the response from the operator network, the device management system 102 initially receives a ticket number. In some implementations, the device management system 102 receives the ticket number from the operator network via the selected adapter module. The device management system 102 then polls, using the selected adapter module, the operator network based on the ticket number. The device management system 102 further, in response to polling, receives, using the selected adapter module, the response from the operator network. In some implementations, to receive the response from the operator network, the device management system 102 receives, using the selected adapter module, a push message encapsulating the response from the network.

In some implementations, to bridge the communication between the interface module 104 and the first and second operator networks, the device management system 102 further initiates, using at least one of the selected first and second adapter modules, a timer defining a predetermined time interval. In these implementations, to receive at least one of the first and second responses 114-A, 114-B from the first and second operator networks, the device management system 102 receives, using the selected adapter module, a particular one of the first and second responses 114-A, 114-B based on the timer, such as upon expiration of the predetermined time interval defined by the timer.

In some implementations, each of the first and second responses 114-A, 114-B includes one or more results. For example, in some implementations, each of one or more of the results may correspond to data describing one or more particular parameters of the first and/or second mobile devices. In these implementations, to aggregate the first and second responses 114-A, 114-B, the device management system 102 selects, using the aggregator module 106B, at least one (e.g., a threshold number) of the one or more results from each of the first and second responses 114-A, 114-B. In some implementations, to aggregate the first and second responses 114-A, 114-B, the device management system 102 selects, using the aggregator module 106B, a first subset of the one or more results from at least one of the first and second responses 114-A, 114-B. In these implementations, the device management system 102 further receives, at the interface module 104, a result request 112-B and selects, using the aggregator module 106B, a second, different subset of the one or more results from the at least one of the first and second responses 114-A, 114-B in response to receiving the result request 112-B. In some implementations, the result request 112-B includes one or more pointers (e.g., indices) identifying one or more of the first and second subsets of the one or more results from the at least one of the first and second responses 114-A, 114-B. Accordingly, in some implementations, the device management system 102 enables the enterprise user 110 to initially access one or more of the results associated with the first and second responses 114-A, 114-B and later access one or more additional ones of the results.

In some implementations, the device management system 102 further receives, at the interface module 104, a search query 112-C identifying one or more of the mobile devices 122-1 . . . 122-M and one or more of the operator networks 116-1 . . . 116-N that are associated with the mobile devices. In these implementations, the device management system 102 further selects, using the delegator module 106A, one or more of the plurality of adapter modules 108-1 . . . 108-N based on the search query 112-C. In these implementations, the device management system 102 still further performs, using the selected adapter modules, a search of the operator networks identified by the search query 112-C based on the query 112-C. In these implementations, the device management system 102 also receives, using the selected adapter modules, one or more search results from the operator networks identified by the search query 112-C in response to performing the search. Accordingly, in some implementations, the device management system 102 enables the enterprise user 110 to perform searches of the operator networks 116-1 . . . 116-N for one or more of the mobile devices 122-1 . . . 122-M that are deployed on the networks 116-1 . . . 116-N.

For example, in some implementations, the search query 112-C identifies multiple ones of the mobile devices 122-1 . . . 122-M that are each associated with an International Mobile Station Equipment Identity (IMEI), or another identifier, having a value within a particular range. In these implementations, the device management system 102 identifies one or more sources, or one or more of the operator networks 116-1 . . . 116-N, which may have associated therewith the mobile devices identified by the search query 112-C. In these implementations, the device management system 102 further determines whether an enterprise associated with the system 102 has an active subscription account corresponding to each of the identified sources or operator networks. In these implementations, the device management system 102 then identifies those of the adapter modules 108-1 . . . 108-N that are associated with the identified sources or operator networks for which the enterprise has an active subscription account. The device management system 102 subsequently delegates the search query 112-C to the identified adapter modules, and, in some implementations, starts a timer defining a predetermined time interval. In these implementations, upon the timer expiring, or upon the device management system 102 receiving responses from all the sources or operator networks, the device management system 102 aggregates the responses and presents the aggregated response to the enterprise user 110, e.g., via a GUI.

In some implementations, the device management system 102 aggregates, using the delegator module 106A and/or the aggregator module 106B, various types of usage information and/or network information associated with one or more of the operator networks 116-1 . . . 116-N. For example, in some implementations, the device management system 102 periodically receives usage information and/or network information from one or more of the adapter modules 108-1 . . . 108-N that are associated with one or more of the operator networks 116-1 . . . 116-N. In some implementations, the device management system 102 receives the usage information and/or the network information from the adapter modules 108-1 . . . 108-N at predetermined time intervals, such as every 7 days, every 24 hours, every hour, or several times per hour, as merely some examples. In some implementations, the device management system 102 further aggregates the received usage information and/or network information. In some implementations, the device management system 102 then transmits, using the interface module 104, the aggregated usage information and/or the aggregated network information to the enterprise user 110 and/or a client device associated with the user 110 or another user. Additionally or alternatively, in some implementations, the device management system 102 displays, using the interface module 104, the aggregated usage information and/or the aggregated network information to the enterprise user 110 via a GUI.

In some implementations, at least one of the selected first and second adapter modules is associated with a first application programming interface (API) configured to receive requests conforming to an adapter API format (e.g., from the interface module 104). In some implementations, at least one of the first and second operator networks is associated with a second API configured to receive requests conforming to a network API format (e.g., from the corresponding adapter module or another device). In other words, in some implementations, at least one of the selected first and second adapter modules and at least one of the first and second operator networks communicate differently, e.g., using different communication formats and/or different communication protocols. In some implementations, the request 112-A conforms to both the adapter API format and the network API format.

In some implementations, the request 112-A conforms to the adapter API format, but does not conform to the network API format. As a result, in some implementations, at least one of the first and second operator networks is unable to interpret the request 112-A received from the interface module 104. In some implementations, to bridge the communication between the interface module 104 and at least one of the first and second operator networks, the device management system 102 translates, using at least one of the selected first and second adapter modules, at least a portion of the request 112-A from the adapter API format to the network API format, such that the corresponding operator network is able to correctly interpret the request 112-A.

In some implementations, the second API is further configured to transmit responses conforming to the network API format (e.g., to the corresponding adapter module or another device) and the first API is further configured to transmit responses conforming to the adapter API format (e.g., to the interface module 104). As a result, in some implementations, the interface module 104 is unable to interpret at least one of the first and second responses 114-A, 114-B received from at least one of the first and second operator networks. In some implementations, to bridge the communication between the interface module 104 and at least one of the first and second operator networks, the device management system 102 translates, using at least one of the selected first and second adapter modules, at least a portion of each of one or more of the first and second responses 114-A, 114-B from the network API format to the adapter API format, such that the interface module 104 is able to correctly interpret the response.

In some implementations, at least one of the selected first and second adapter modules includes one of a representational state transfer (REST)-based adapter module, a simple object access protocol (SOAP)-based adapter module, and a file-based adapter module. In some implementations, one of the adapter API format and the network API format includes one of a REST API format, a SOAP API format, and a file-based API format and another one of the adapter API format and the network API format includes another one of the REST API format, the SOAP API format, and the file-based API format.

Figure 2:
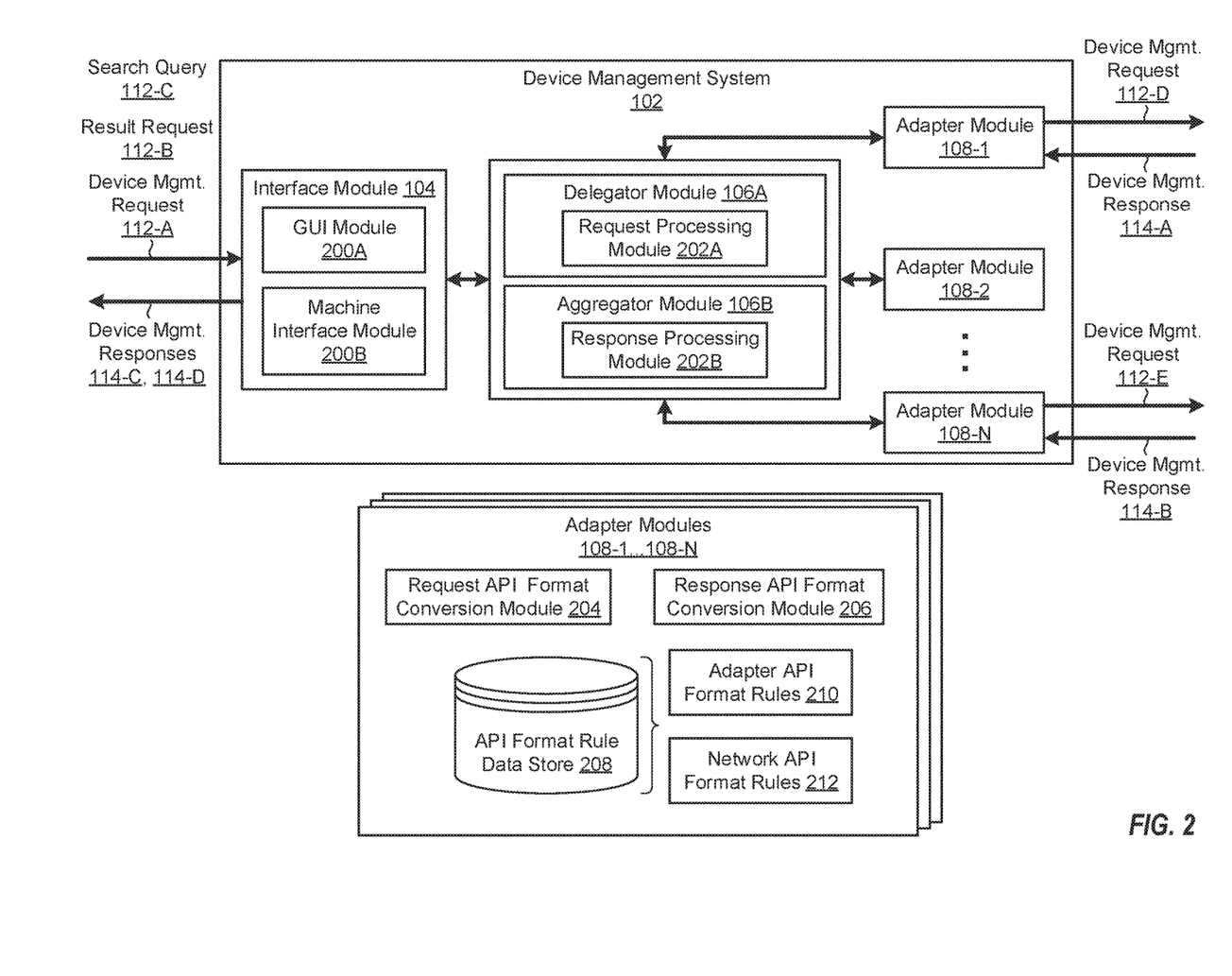
FIG. 2 is a block diagram of the device management system in accordance with some implementations.

FIG. 2 is a block diagram of an example implementation of the device management system 102 described with reference to FIG. 1. The device management system 102 of FIG. 2 includes the interface module 104, the delegator module 106A, the aggregator module 106B, and the adapter modules 108-1 . . . 108-N. Briefly, the interface module 104 enables communication between the device management system 102 and the enterprise user 110. In some implementations, the interface module 104 enables communication between the device management system 102 and a client device (not shown) associated with the enterprise user 110 or another user. The delegator module 106A, the aggregator module 106B, and the adapter modules 108-1 . . . 108-N, in turn, enable communication between the device management system 102 and the operator networks 116-1 . . . 116-N. As a result, the device management system 102 bridges communication between the interface module 104 and, therefore, the enterprise user 110 and/or the client device, and the operator networks 116-1 . . . 116-N. As described herein, bridging of the communication in this manner may, in some examples, allow the enterprise user 110 and/or the client device to manage the mobile devices 122-1 . . . 122-M on the operator networks 116-1 . . . 116-N.

In the example of FIG. 2, the interface module 104 initially receives the request 112-A from the enterprise user 110. In some implementations, the interface module 104 displays a GUI to the enterprise user 110 using a GUI module 200A included in the interface module 104. In some implementations, the interface module 104 receives the request 112-A from the enterprise user 110 via the GUI. In some implementations, the enterprise user 110 specifies the request 112-A by inputting one or more parameters associated with two or more of the mobile devices 122-1 . . . 122-M and the corresponding two or more of the operator networks 116-1 . . . 116-N on which the devices are deployed into the GUI. In some implementations, the interface module 104 receives the request 112-A from the enterprise user 110 via a client device associated with the user 110 using a machine interface module 200B included in the interface module 104. In some implementations, the enterprise user 110 specifies the request 112-A using a GUI displayed at the client device in a similar manner as previously described.

In the example of FIG. 2, the delegator module 106A further selects two or more of the adapter modules 108-1 . . . 108-N based on the request 112-A received by the interface module 104. In some implementations, the delegator module 106A selects the adapter modules configured to communicate with the operator networks identified by the request 112-A. In some implementations, the delegator module 106A selects the adapter modules that are associated with active subscription accounts. In some implementations, to select the adapter modules, the delegator module 106A processes the request 112-A using a request processing module 202A included in the delegator module 106A. In some implementations, the request processing module 202A initially determines whether the request 112-A explicitly or implicitly indicates particular ones of the operator networks 116-1 . . . 116-N. In the event the request 112-A indicates any such operator networks, the delegator module 106A further determines whether the networks are also associated with particular ones of the adapter modules 108-1 . . . 108-N. In the event the operator networks are associated with such adapter modules, the delegator module 106A selects the adapter modules. In some implementations, the request processing module 202A directly determines a correspondence between the operator networks indicated by the request 112-A and the operator networks associated with the selected adapter modules. In some implementations, the request processing module 202A makes a call to one or more of the selected adapter modules based on the request 112-A. In some implementations, the call includes the request 112-A. In the example of FIG. 2, the delegator module 106A selects the adapter modules 108-1 and 108-N. In other examples, the delegator module 106A may select one or more other ones (e.g., more than two) of the adapter modules 108-1 . . . 108-N.

In the example of FIG. 2, the selected ones of the adapter modules 108-1 . . . 108-N subsequently bridge communication between the interface module 104 and those of the operator networks 116-1 . . . 116-N identified by the request 112-A. As described herein, in some implementations, to bridge the communication, each selected adapter module performs one or more of (1) transmitting the request 112-A to the network; and (2) receiving a response (e.g., one of the response 114-A, 114-B) from the network in response to transmitting the request 112-A, and transmitting the response to the aggregator module 106B.

As further described herein, in some implementations, each of one or more of the selected adapter modules further translates the request 112-A from an adapter API format associated with the adapter module to a network API format associated with the corresponding operator network, thereby generating a translated version of the request (e.g., one of the translated requests 112-D, 112-E). As also described herein, in some implementations, each of one or more of the selected adapter module also translates the response received from the corresponding operator network from the network API format to the adapter API format, thereby generating a translated version of the response (e.g., one of the translated responses 114-C, 114-D). To that end, as shown in FIG. 2, in some implementations, each of one or more of the adapter modules 108-1 . . . 108-N includes a request API format conversion module 204, a response API format conversion module 206, and an API format rule data store 208. In some implementations, the API format rule data store includes adapter API format rules 210 and network API format rules 212.

In some implementations, the request API format conversion module 204 enables the corresponding adapter module to translate the request 112-A from the adapter API format to the network API format using the adapter API format rules 210 and the network API format rules 212. In some implementations, the adapter API format rules 210 and the network API format rules 212 each specify one or more specific data fields (e.g., a header field, etc.) for the request 112-A and the translated version of the request (e.g., the translated requests 112-D, 112-E) to conform to their respective adapter and network API formats. Similarly, in some implementations, the response API format conversion module 206 enables the adapter module to translate a response (e.g., the responses 114-A, 114-B) from the network API format to the adapter API format using the adapter API format rules 210 and the network API format rules 212. In some implementations, the adapter API format rules 210 and the network API format rules 212 each further specify one or more specific data fields (e.g., a header field, etc.) for the response and the translated version of the response (e.g., the translated responses 114-C, 114-D) to conform to their respective network and adapter API formats, in a similar manner as previously described.

In some implementations, the request API format conversion module 204 synthesizes a data container (e.g., a JavaScript Object Notation (JSON) object) that represents the translated version of the request. In some implementations, the request API format conversion module 204 writes information from the original request 112-A into the data container according to the network API format rules 212. In some implementations, the request API format conversion module 204 includes in the data container one or more specific data fields that the corresponding operator network expects in the translated version of the request in accordance with the network API format rules 212.

Similarly, in some implementations, the response API format conversion module 206 synthesizes a data container (e.g., a JSON object) that represents the translated version of a response. In some implementations, the response API format conversion module 206 writes information from an original response into the data container according to the adapter API format rules 210. In some implementations, the response API format conversion module 206 includes in the data container one or more specific data fields that the interface module 104 expects in the translated response according to the adapter API format rules 210.

Figure 3:
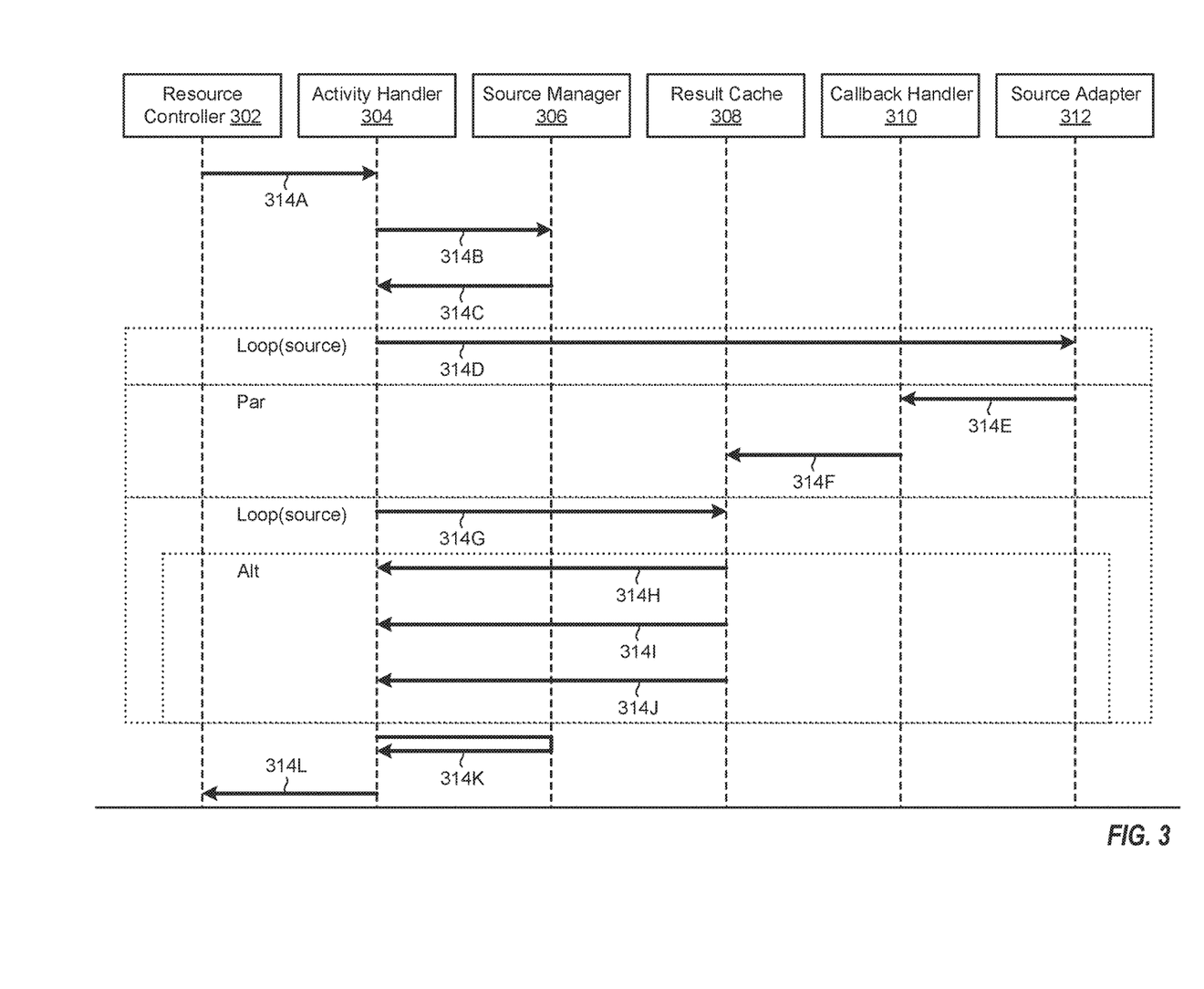
FIG. 3 is a data flow diagram illustrating example operation of a device management system in accordance with some implementations.

FIG. 3 is a data flow diagram illustrating example operation of the device management system 102 described with reference to FIGS. 1 and 2. In the example of FIG. 3, the device management system 102 includes a resource controller 302, an activity handler 304, a source manager 306, a result cache 308, a callback handler 310, and a source adapter 312. In some implementations, the interface module 104 corresponds to and/or includes the resource controller 302. In some implementations, the delegator module 106A corresponds to and/or includes the activity handler 304 and the source manager 306. In some implementations, the aggregator module 106B corresponds to and/or includes the activity handler 304, the callback handler 310 and/or the result cache 308. In some implementations, the source adapter 312 corresponds to and/or includes one of the adapter modules 108-1 . . . 108-N. In some implementations, the result cache 310 corresponds to and/or includes a memory device, or simply "memory," configured to store responses received from the operator networks 116-1 . . . 116-N via the corresponding adapter modules 108-1 . . . 108-N in the manner described herein.

In the example of FIG. 3, the resource controller 302 initially receives the request 112-A from the enterprise user 110 of the device management system 102. In some implementations, the resource controller 302 receives the request 112-A via a client device of the enterprise user 110. In some implementations, the request 112-A specifies one or more parameters and identifies a customer, such as an enterprise, associated with the enterprise user 110. The resource controller 302 transmits the request 112-A to the activity handler 304 (314A). The activity handler 304 queries the source manager 306 for one or more sources, or one or more of the operator networks 116-1 . . . 116-N, which are able to service the request 112-A (314B). In other words, the activity handler 304 queries the source manager 306 for one or more of the adapter modules 108-A . . . 108-N to which the activity handler 304 is able to delegate the request 112-A. The source manager 306 identifies and selects one or more of the adapter modules 108-A . . . 108-N to which the activity handler 304 is able to delegate the request 112-A based on the request 112-A. In some implementations, the source manager 306 selects one or more of the adapter modules 108-A . . . 108-N based on the customer (e.g., the enterprise) specified by the request 112-A. Additionally or alternatively, in some implementations, the source manager 306 selects one or more of the adapter modules 108-A . . . 108-N based on the parameters specified by the request 112-A.

In the example of FIG. 3, the activity handler 304 further receives an indication of the selected one or more of the adapter modules 108-A . . . 108-N to which the activity handler 304 is able to delegate the request 112-A (314C).

The activity handler 304 subsequently delegates the request 112-A to the selected one or more of the adapter modules 108-A . . . 108-N (314D). In some implementations, each instance of such delegation includes the parameters specified by the request 112-A, a result ID associated with the corresponding one of the operator networks 116-1 . . . 116-N, and a timeout parameter specifying a predetermined period of time (e.g., a timer). In response to delegating the request 112-A to the selected one or more of the adapter modules 108-A . . . 108-N, the callback handler 310 receives one or more responses (e.g., the responses 114-A, 114-B) from the selected one or more of the adapter modules 108-A . . . 108-N (314E). In some implementations, each response includes a result ID and one or more results. The callback handler 310 then stores, or buffers, the responses in the result cache 308 for one or more subsequent retrievals, as described in greater detail below (314F).

In various implementations, the activity handler 304 handles (e.g., processes) the responses until the expiration of the predetermined period of time. In the example of FIG. 3, until the expiration of the predetermined period of time specified by the timeout parameter, the activity handler 304 retrieves the responses (e.g., one or more of the results from each of one or more of the responses) from the result cache 308 (314G-314J). For example, in some implementations, the activity handler 304 fetches each of one or more of the responses (e.g., the corresponding results) based on the result ID associated with the response by interacting with the corresponding one of the operator networks 116-1 . . . 116-N (314K). In some implementations, each of one or more of the responses (e.g., the corresponding results) is associated with a particular status, such as that of "success" or "error," indicating successful retrieval of the response or failure to retrieve the response, respectively. In some implementations, the activity handler 304 further aggregates the responses (e.g., the corresponding results) by merging the responses (e.g., the corresponding results) and transmits the aggregated responses to the resource controller 302 (314L). In some implementations, the resource controller 302 then transmits the aggregated responses (e.g., aggregated results) to the enterprise user 110 or a client device of the user 110, or displays the aggregated responses to the user 110 via a GUI.

In some implementations, a cache management module (not shown) manages the result cache 308. For example, in some implementations, the cache management module deletes responses or elements thereof (e.g., the corresponding results) from the result cache 308 after the activity handler 304 has retrieved the responses or elements from the result cache 308 in the manner described herein. In some implementations, the cache management functionality described above is performed by the activity handler 304.

In some implementations, the resource controller 302 receives an additional request, namely a result request 112-B, to view one or more additional ones of the responses (e.g., one or more additional ones of the corresponding results). For example, in some implementations, the resource controller 302 receives the result request 112-B to view the additional responses or results included therein after transmitting or displaying the aggregated responses to the enterprise user 110 in the manner previously described. In some implementations, the result request 112-B includes one or more pointers (e.g., indices). For example, in some implementations, each of one or more of the pointers corresponds to a particular one of the sources, or operator networks, and indicates one of the results received from the network that have already been transmitted or displayed to the enterprise user 110. In some implementations, each of one or more of the pointers includes at least a pair of numbers or other indicators that indicate a position attribute and a scroll attribute associated with the corresponding result. In some implementations, for each of one or more of the sources, or operator networks, the activity handler 304 further identifies, using the result request 112-B, a next batch of one or more other results received from the network to be transmitted or displayed to the enterprise user 110. For example, in some implementations, the activity handler 304 identifies at least one additional result that has not been transmitted or displayed to the enterprise user 110 based on the pointers included in the result request 112-B. For instance, in some implementations, for a particular source, or operator network, the activity handler 304 selects a threshold number of results that immediately follow an already transmitted or displayed result that is associated with a pointer included in the result request 112-B. The activity handler 304 then aggregates the next batch of the results for the source, or operator network, with other results and transmits the aggregated next batch to the resource controller 302 in a similar manner as previously described.

In some implementations, the device management system 102 maintains a record of various states of the sources, or operator networks, and the responses or the results included therein received from the networks, in a memory device included in the system 102. In other words, in some implementations, the device management system 102 retains information indicating which portions of the responses received from the sources, or operator networks, have been processed (e.g., transmitted or displayed to the enterprise use 110), and which portions of the responses have not been processed. For example, in some implementations, the device management system 102 stores an indication of a visual cursor associated with displayed one or more results received from one or more of the sources, or operator networks. In other words, in some implementations, the device management system 102 stores an indication of which of the one or more results received from the one or more of the sources, or operator networks, are currently displayed to the enterprise user 110.

Figure 4:
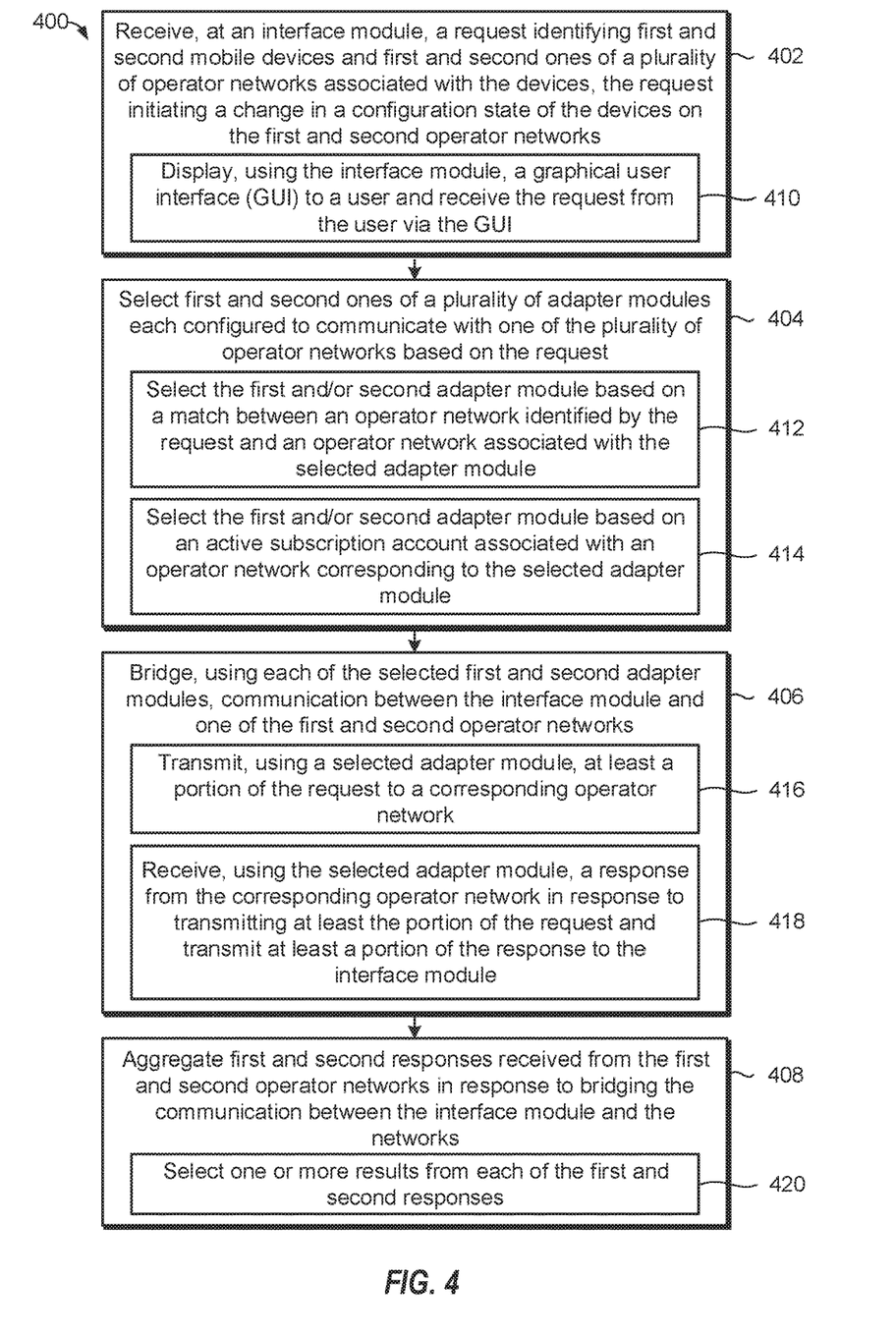
FIG. 4 is a flowchart representation of a method of managing mobile devices deployed on different operator networks in accordance with some implementations.

FIG. 4 is a flowchart representation of a method 400 of managing multiple mobile devices that are deployed on multiple different operator networks, in accordance with some implementations. The method 400 may be implemented as a set of one or more computer readable instructions that are stored in one or more memory components and executed by one or more central processing units (CPUs) included in the device management system 102. Briefly, the example method 400 includes receiving a request 112-A at the interface module 104 and selecting two of the adapter modules 108-1 . . . 108-N using the delegator module 106A based on the request 112-A. The example method 400 further includes bridging communication between the interface module 104 and two of the operator networks 116-1 . . . 116-N that are associated with the selected adapter modules using the adapter modules. The example method 400 also includes aggregating two responses received from the two operator networks in response to bridging the communication between the interface module 104 and the operator networks using the aggregator module 106B.

As shown in block 402, the device management system 102 initially receives, at the interface module 104, a request 112-A that includes an indicator (e.g., packetized binary data). In this example, the indicator identifies first and second ones of the mobile devices 122-1 . . . 122-M and first and second ones of the operator networks 116-1 . . . 116-N that are associated with the first and second devices. Also in this example, the request 112-A initiates a change in a configuration state of the first and second mobile devices on the first and second operator networks. In other words, the request 112-A is configured to manage the first and second mobile devices on the first and second operator networks. In some implementations, the first and second operator networks are each associated with a particular one of the first and second mobile devices. In these implementations, the request 112-A initiates a change in a configuration state of each of the first and second mobile devices on the corresponding one of the first and second operator networks. For example, in some implementations, the request 112-A initiates a change to one or more parameters of each of the first and second mobile devices that pertain to the corresponding one of the first and second operator networks. As shown in block 410, in some implementations, the device management system 102 further displays, using the interface module 104, a GUI to a user and receives the request 112-A from the user via the GUI.

As shown in block 404, the device management system 102 further selects, e.g., using the delegator module 106A, first and second ones of the adapter modules 108-1 . . . 108-N based on the request 112-A. In this example, each of the adapter modules 108-1 . . . 108-N is configured to communicate with a particular one of the operator networks 116-1 . . . 116-N. In some implementations, the selected first and second adapter modules are each configured to communicate with a particular one of the first and second operator networks identified by the request 112-A. In this manner, the device management system 102 selects adapter modules that are configured to communicatively interface with operator networks on which mobile devices identified by the request 112-A are deployed. As shown in block 412, in some implementations, the device management system 102 selects each of one or more of the first and second adapter modules based on a textual, numeric, symbolic, and/or another type of match between an operator network identified by the request 112-A and an operator network associated with the selected adapter module. As shown in block 414, in some implementations, the device management system 102 selects each of one or more of the first and second adapter modules based on an active subscription account associated with an operator network corresponding to the selected adapter module. In other words, in some implementations, the device management system 102 selects a particular one of the first and second adapter modules upon determining the existence of an active subscription account that is associated with an operator network corresponding to the selected adapter module.

As shown in block 406, the device management system 102 subsequently bridges, using each of the selected first and second adapter modules, communication between the interface module 104 and a particular one of the first and second operator networks identified by the request 112-A. In this manner, the device management system 102 uses adapter modules selected based on the request 112-A to serve as communication interfaces between the interface module 104 and operator networks on which mobile devices identified by the request 112-A are deployed. In some implementations, as shown in block 416, to bridge the communication between the interface module 104 and each of one or more of the first and second operator networks, the device management system 102 transmits at least a portion of the request 112-A to the network using the corresponding selected adapter module. In some implementations, as shown in block 418, the device management system 102 further receives, using the corresponding selected adapter module, a response (e.g., one of the responses 114-A, 114-B) from the operator network in response to transmitting at least the portion of the request 112-A. In these implementations, the device management system 102 then transmits at least a portion of the response to the interface module 104 using the corresponding selected adapter module. As described in greater detail below, in some implementations, the device management system 102 transmits at least the portion of the response to the interface module 104 after aggregating the response with one or more other responses by the aggregator module 106B. As described herein, in some implementations, the device management system 102 also translates an API format associated with one or more of the request 112-A and the response using the corresponding selected adapter module.

As shown in block 408, the device management system 102 then aggregates, using the aggregator module 106B, first and second responses 114-A, 114-B received from the first and second operator networks identified by the request 112-A in response to bridging the communication between the interface module 104 and the networks. In some implementations, as shown in block 420, to aggregate the first and second responses 114-A, 114-B, the device management system 102 selects, using the aggregator module 106B, one or more results from each response. For example, in some implementations, the device management system 102 selects a subset, such as a threshold number, of the results included in each of one or more of the first and second responses 114-A, 114-B.

Figure 5:
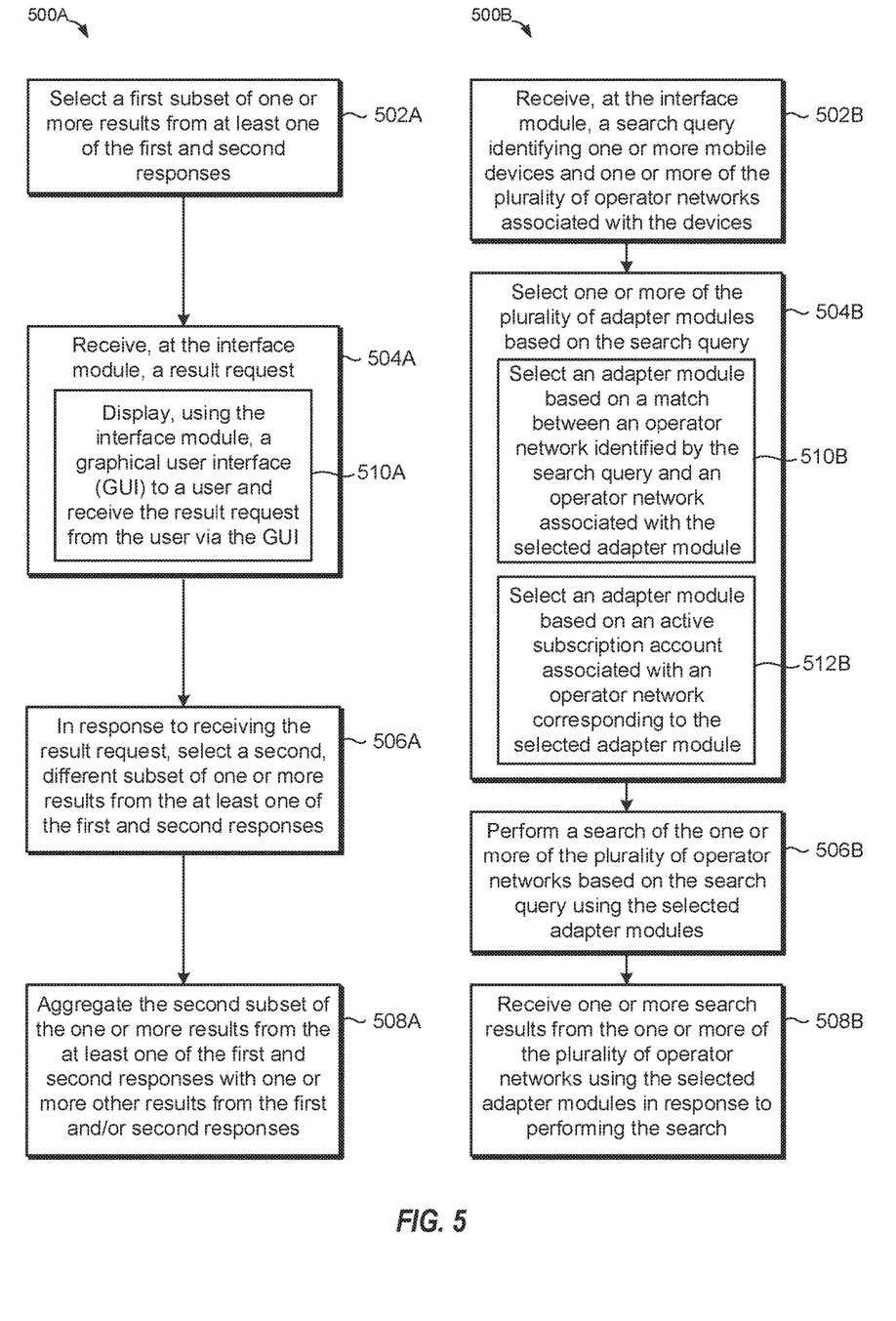
FIG. 5 is a flowchart representation of other methods of managing mobile devices deployed on different operator networks in accordance with some implementations.

FIG. 5 is a flowchart representation of methods 500A and 500B of managing multiple mobile devices that are deployed on multiple different operator networks, in accordance with some implementations. In some implementations, the methods 500A and 500B illustrate particular aspects of the method 400 described with reference to FIG. 4. The methods 500A and 500B may each be implemented as a set of one or more computer readable instructions that are stored in one or more memory components and executed by one or more CPUs included in the device management system 102. Briefly, the example method 500A includes receiving the result request 112-B at the interface module 104 and selecting one or more additional results received from the first and second responses 114-A, 114-B received from the first and second operator networks identified by the request 112-A in response to bridging the communication between the interface module 104 and the networks. The example method 500B, in turn, includes receiving the search query 112-C at the interface module 104 and performing a search for one or more of the mobile devices 122-1 . . . 122-M that are associated with one or more of the operator networks 116-1 . . . 116-N.

In the example method 500A, each of one or more of the first and second responses 114-A, 114-B includes one or more results. In this example, as shown in block 502A, to aggregate the first and second responses 114-A, 114-B in the manner described with reference to the method 400, the device management system 102 selects, using the aggregator module 106B, a first subset of one or more results from at least one of the first and second responses 114-A, 114-B. As shown in block 504A, the device management system 102 further receives, at the interface module 104, the result request 112-B. As shown in block 510A, in some implementations, the device management system 102 displays, using the interface module 104, a GUI to a user and receives the result request 112-B from the user via the GUI, in a similar manner as previously described with reference to the request 112-A. As shown in block 506A, in response to receiving the result request 112-B, the device management system 102 selects, using the aggregator module 106B, a second, different subset of the one or more results from the at least one of the first and second responses 114-A, 114B. In some implementations, the method 500A includes operations indicated by blocks 404, 406 and/or 408. In some implementations, the result request 112-B includes one or more pointers (e.g., indices) identifying one or more of the first and second subsets of the one or more results from the at least one of the first and second responses 114-A, 114-B. As shown in block 508A, the device management system 102 optionally aggregates, using the aggregator module 106B, the second subset of the one or more results with one or more other results previously and/or subsequently selected from the first and/or second responses 114-A, 114-B.

As shown in block 502B of the example method 500B, the device management system 102 receives, at the interface module 104, the search query 112-C identifying one or more of the mobile devices 122-1 . . . 122-M and one or more of the operator networks 116-1 . . . 116-N that are associated with the devices. As shown in block 504B, the device management system 102 further selects, using the delegator module 106A, one or more of the plurality of adapter modules 108-1 . . . 108-N based on the search query 112-C, in a similar manner as previously described with reference to the request 112-A. For example, as shown in blocks 510B and 512B, the device management system 102 may select a particular one of the adapter modules based on a textual, numeric, symbolic, and/or another type of match between an operator network identified by the search query 112-C and an operator network associated with the selected adapter module and/or based on an active subscription account associated with the network. As shown in block 506B, the device management system 102 then performs a search of the operator networks identified by the search query 112-C based on the query 112-C using the selected adapter modules. As shown in block 508B, in response to performing the search, the device management system 102 receives one or more search results from the operator networks using the selected adapter modules. In some implementations, the search query 112-C does not identify a particular operator network 116. In such implementations, the delegator module 106A selects adapter modules 108 associated with operator networks 118 on which the enterprise user 110 has one or more mobile devices 122.

Figure 6:
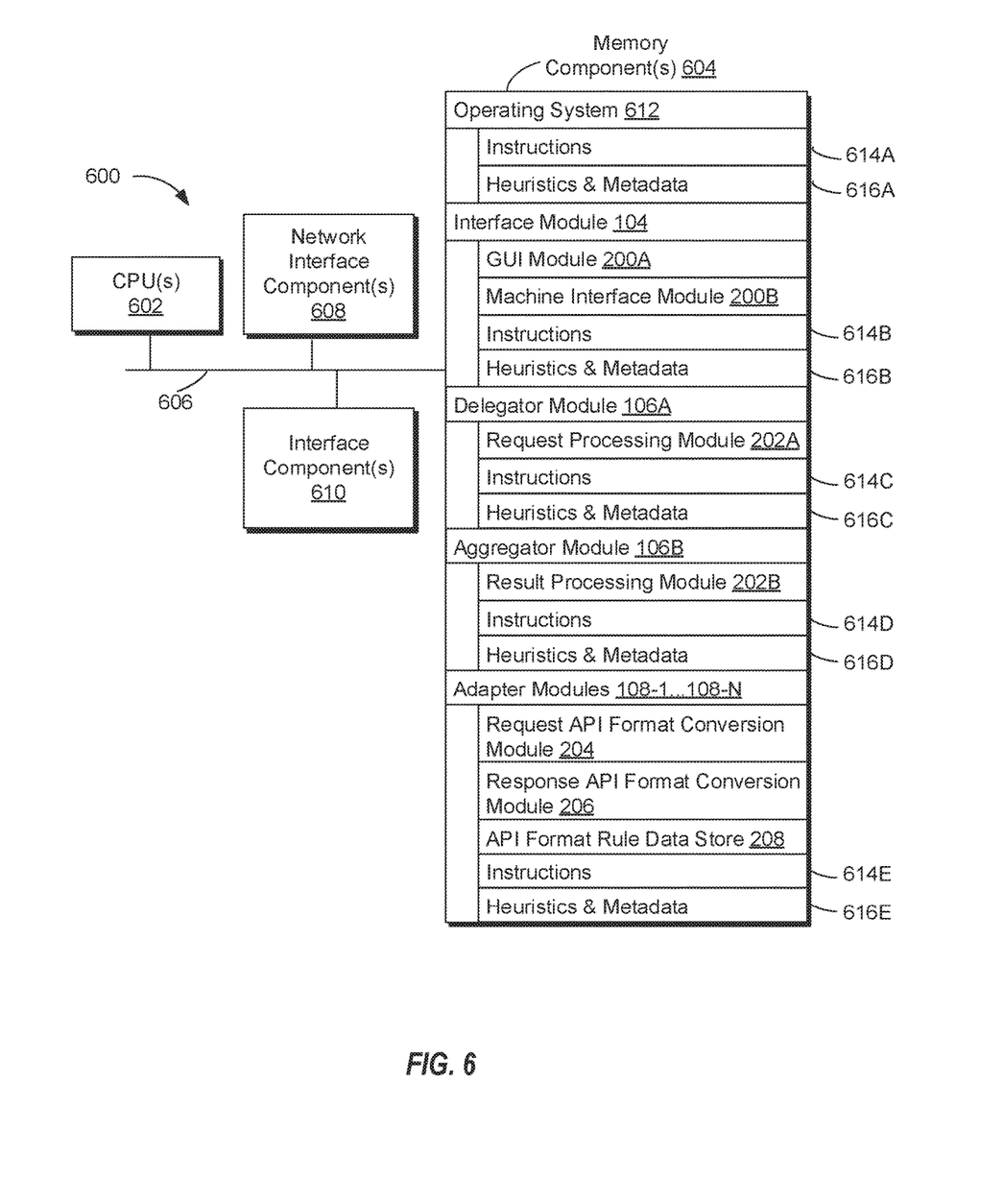
FIG. 6 is a block diagram of a server system enabled with various modules provided to manage mobile devices deployed on different operator networks in accordance with some implementations.

FIG. 6 is a block diagram of a server system 600 enabled with one or more components of the device management system 102 depicted in and described with reference to FIGS. 1 and 2, in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 includes one or more CPUs 602, one or more memory components 604, one or more network interface components 608, one or more interface components 610, and one or more communication buses 606 interconnecting these and various other components.

In some implementations, the one or more communication buses 606 include circuitry that interconnects and controls communication between various components of the server system 600. In some implementations, the memory component(s) 604 include high-speed random access memory, such as DRAM, SRAM, DDR RAM, or other random access solid state memory devices. In some implementations, the memory component(s) 604 include non-volatile memory, such as one or more magnetic disk storage devices, optical disk storage devices, flash memory devices, or other non-volatile solid state storage devices. In some implementations, the memory component(s) 604 also optionally include one or more storage devices that are located remotely from the CPU(s) 602. In some implementations, the memory component(s) 604 include non-transitory computer readable storage media.

In some implementations, the memory component(s) 604 store some or all of the following programs, modules, and data structures, including an optional operating system 612, the interface module 104, the delegator module 106A, the aggregator module 106B, and the adapter modules 108-1 . . . 108-N. In some implementations, the operating system 612 includes procedures for handling various basic system services and for performing hardware-dependent tasks associated with the server system 600. In some implementations, the interface module 104 further includes one or more of the GUI module 200A and the machine interface module 200B. In some implementations, the delegator module 106A further includes the request processing module 202A. In some implementations, the aggregator module 106B further includes the response processing module 202B. In some implementations, one or more of the adapter modules 108-1 . . . 108-N each further includes the request API format conversion module 204, the response API format conversion module 206, and the API format data store 208.

In some implementations, the interface module 104 receives, such as interprets and/or processes, one or more of the request 112-A, the result request 112-B, and the search query 112-C from the enterprise user 110, as described herein. In some implementations, the interface module 104 receives one or more of the request 112-A, the result request 112-B, and the search query 112-C from a client device associated with the enterprise user 110 or another user. To that end, in some implementations, the interface module 104 includes various instructions and/or logic 614A and heuristics and metadata 616A. In some implementations, the delegator module 106A selects two or more of the adapter modules 108-1 . . . 108-N based on the request 112-A, or based on the search query 112-C, as further described herein. To that end, in some implementations, the delegator module 106A includes instructions and/or logic 614B and heuristics and metadata 616B. In some implementations, the aggregator module 106B aggregates two or more responses (e.g., the responses 114-A, 114-B) received from those of the operator networks 116-1 . . . 116-N that are associated with the selected adapter modules, as still further described herein. To that end, in some implementations, the aggregator module 106B includes instructions and/or logic 614C and heuristics and metadata 616C. In some implementations, the selected adapter modules bridge communication between the interface module 104 and those of the operator networks 116-1 . . . 116-N that are associated with the selected adapter modules, as also described herein. To that end, in some implementations, the selected adapter modules each include instructions and/or logic 614D and heuristics and metadata 616D.

While various aspects of implementations within the scope of the appended claims are described above, it should be apparent that the various features of implementations described above may be embodied in a wide variety of forms and that any specific structure and/or function described above is merely illustrative. Based on the present disclosure, one skilled in the art should appreciate that an aspect described herein may be implemented independently of any other aspects and that two or more aspects may be combined in various ways. For example, an apparatus may be implemented and/or a method may be practiced using any number of aspects set forth herein. In addition, such an apparatus may be implemented and/or such a method may be practiced using other structure and/or functionality in addition to, or other than, one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the "second contact" also are renamed consistently. Stated another way, the first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or," as used herein, refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device management system configured to manage multiple mobile devices associated with different operator networks, wherein the device management system includes a non-transitory memory and one or more processors:
        selecting, using a delegator module, first and second adapter modules of a plurality of adapter modules based on a request that initiates a change in a configuration state of a mobile device, wherein each of the plurality of adapter modules is configured to communicate with a corresponding particular one of the plurality of operator networks;
        bridging, using the selected first and second adapter modules, communication between an interface module and a particular one of the first and second ones of the plurality of operator networks; and aggregating, using an aggregator module, first and second responses received from the first and second operator networks in response to bridging the communication between the interface module and the first and second operator networks.

2. The method of claim 1 further comprising:
receiving, at the interface module, a request including an indicator identifying first and second mobile devices and first and second operator networks of a plurality of operator networks associated with the first and second mobile devices, wherein the request initiates a change in a configuration state of the first and second mobile devices on the first and second ones of the plurality of operator networks.

3. The method of claim 1, wherein each of the first and second operator networks is associated with a particular one of the first and second mobile devices, and wherein the request initiates a change in a configuration state of each of the first and second mobile devices on a corresponding one of the first and second operator networks.

4. The method of claim 1, wherein each of the selected first and second adapter modules is configured to communicate with a particular one of the first and second operator networks.

5. The method of claim 1, further comprising:
determining, using the delegator module, an active subscription account corresponding to at least one of the first and second operator networks; and
selecting, using the delegator module, at least one of the first and second adapter modules based on the determination.

6. The method of claim 1, further comprising displaying, using the interface module, a graphical user interface (GUI) to a user, wherein receiving the request comprises receiving the request from the user via the GUI.

7. The method of claim 6, further comprising displaying, using the interface module, a visual representation of the aggregated first and second responses to the user via the GUI.

8. The method of claim 1, wherein bridging the communication between the interface module and the first and second operator networks comprises transmitting, using each of the selected first and second adapter modules, at least a portion of the request to a particular one of the first and second operator networks.

9. The method of claim 8, wherein bridging the communication between the interface module and the first and second operator networks further comprises:
receiving, using each of the selected first and second adapter modules, a particular one of the first and second responses from a particular one of the first and second operator networks in response to transmitting at least the portion of the request to the first and second operator networks; and
transmitting, using each of the selected first and second adapter modules, at least a portion of a particular one of the first and second responses to the aggregator module.

10. The method of claim 9, further comprising initiating, using at least one of the selected first and second adapter modules, a timer defining a predetermined time interval, wherein receiving the first and second responses from the first and second operator networks comprises receiving, using the at least one of the selected first and second adapter modules, a particular one of the first and second responses based on the timer upon expiration of the predetermined time interval.

11. The method of claim 1, wherein each of the first and second responses comprises one or more results, and wherein aggregating the first and second responses comprises selecting, using the aggregator module, at least one of the one or more results from each of the first and second responses.

12. The method of claim 11, wherein the request comprises a first request, wherein aggregating the first and second responses comprises selecting, using the aggregator module, a first subset of the one or more results from at least one of the first and second responses, the method further comprising:
receiving, at the interface module, a second request different than the first request; and
selecting, using the aggregator module, a second subset of the one or more results from the at least one of the first and second responses, in response to receiving the second request.

13. The method of claim 11, wherein the second request includes one or more pointers identifying one or more of the first and second subsets of the one or more results from the at least one of the first and second responses.

14. The method of claim 1, further comprising:
receiving, at the interface module, a search query identifying one or more mobile devices associated with one or more of the plurality of operator networks;
selecting, using the delegator module, one or more of the plurality of adapter modules based on the search query;
performing, using the selected one or more of the plurality of adapter modules, a search of the one or more of the plurality of operator networks based on the search query; and
receiving, using the selected one or more of the plurality of adapter modules, one or more search results from the one or more of the plurality of operator networks in response to performing the search.

15. The method of claim 1, further comprising:
receiving, using each of one or more of the plurality of adapter modules, at least one of usage information and network information associated with a particular one of the plurality of operator networks; and
transmitting, using the interface module, the at least one of the usage information and the network information to one or more of a user and a user device associated with the user.

16. The method of claim 1, wherein at least one of the selected first and second ones of the plurality of adapter modules is associated with a first application programming interface (API) configured to receive requests conforming to an adapter API format, and wherein at least one of the first and second operator networks is associated with a second API configured to receive requests conforming to a network API format.

17. The method of claim 16, wherein the request conforms to the adapter API format and does not conform to the network API format, and wherein bridging the communication between the interface module and at least one of the first and second operator networks comprises translating, using at least one of the selected first and second adapter modules, at least a portion of the request from the adapter API format to the network API format.

18. The method of claim 16, wherein the second API is further configured to transmit responses conforming to the network API format, wherein the first API is further configured to transmit responses conforming to the adapter API format, and wherein bridging the communication between the interface module and at least one of the first and second operator networks comprises translating, using at least one of the selected first and second adapter modules, at least a portion of each of one or more of the first and second responses from the network API format to the adapter API format.

19. The method of claim 16, wherein at least one of the selected first and second ones of the plurality of adapter modules comprises one of a representational state transfer (REST)-based adapter module, a simple object access protocol (SOAP)-based adapter module, and a file-based adapter module, wherein one of the adapter API format and the network API format comprises one of a REST API format, a SOAP API format, and a file-based API format, and wherein another one of the adapter API format and the network API format comprises another one of the REST API format, the SOAP API format, and the file-based API format.

20. A device management system comprising:
an interface module;
a delegator module;
an aggregator module;
a plurality of adapter modules, wherein each of the plurality of adapter modules is configured to communicate with a particular one of a plurality of operator networks;
a processor configured to execute computer readable instructions included in a non-transitory memory; and
a non-transitory memory including computer readable instructions, that, when executed by the processor, cause the device management system to:
receive, at the interface module, a request including an indicator identifying first and second mobile devices and first and second ones of a plurality of operator networks associated with the first and second mobile devices, wherein the request initiates a change in a configuration state of the first and second mobile devices on the first and second ones of the plurality of operator networks;
select, using the delegator module, first and second ones of the plurality of adapter modules based on the request;
bridge, using each of the selected first and second ones of the plurality of adapter modules, communication between the interface module and a particular one of the first and second ones of the plurality of operator networks; and
aggregate, using the aggregator module, first and second responses received from the first and second ones of the plurality of operator networks in response to bridging the communication between the interface module and the first and second ones of the plurality of operator networks.

* * * * *